Figures 1, 4, 5:
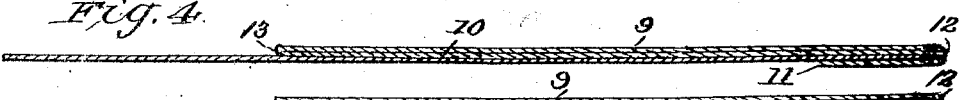

A. F. NORTON.
MEANS USED IN ACCOUNTING SYSTEMS.
APPLICATION FILED JUNE 20, 1911.

1,097,107.

Patented May 19, 1914.

2 SHEETS—SHEET 1.

Witnesses

Inventor
Aaron F. Norton
By , Attorneys

A. F. NORTON.
MEANS USED IN ACCOUNTING SYSTEMS.
APPLICATION FILED JUNE 20, 1911.
1,097,107.
Patented May 19, 1914.
2 SHEETS—SHEET 2.
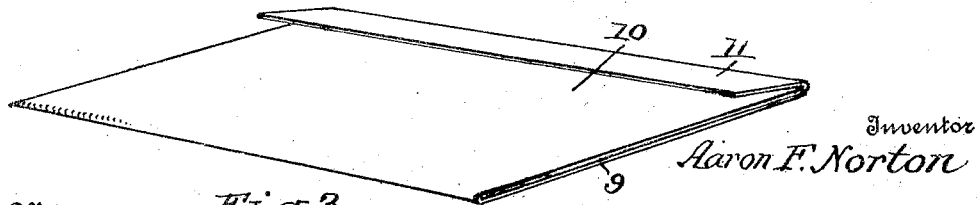

UNITED STATES PATENT OFFICE.

AARON F. NORTON, OF LOS ANGELES, CALIFORNIA.

MEANS USED IN ACCOUNTING SYSTEMS.

1,097,107. Specification of Letters Patent. Patented May 19, 1914.

Application filed June 20, 1911. Serial No. 634,383.

*To all whom it may concern:*

Be it known that I, AARON F. NORTON, citizen of the United States, residing at Los Angeles, in the county of Los Angeles and State of California, have invented certain new and useful Improvements in Means Used in Accounting Systems, of which the following is a specification.

This invention aims to disclose a novel accounting system and a novel ledger card or sheet and statement sheet, the primary aim of the invention being to obtain at one operation, by hand or machine, two or more copies and results of different accountings, and doing so in a correct and rapid manner.

While the principle of the invention may be carried out in numerous places of accounting work, the invention is designed primarily to save time and labor in carrying large or duplicate statements and entering items upon a ledger card or sheet or in a ledger.

For a full understanding of the invention reference is to be had to the following description and accompanying drawing in which:—

Figure 1 is a plan view of a ledger card and statement sheet, embodying the invention, assembled. Fig. 2 is a similar view, a portion of the statement sheet being broken away. Fig. 3 is a perspective view of the statement sheet. Fig. 4 is a transverse sectional view through the ledger card and statement sheet. Fig. 5 is a similar view showing a slight modification of the statement sheet.

Corresponding and like parts are referred to in the following description and indicated in all the views of the accompanying drawing by the same reference characters.

In the drawings there is shown a ledger card which, however, may be a ledger sheet or one leaf of a book ledger, or may be an account sheet of some other type. The ledger card, which is indicated by the numeral 1, is printed upon one side with columns 2, 3, 4, 5, and 6 having the headings "Date," "Discount," "Debits," "Credits" and "Balance," respectively, and these columns are divided transversely of the sheet by ledger lines 7. At the left hand side of the sheet and slightly spaced from the date column 2 is a column 8 of indices which may be numerals, letters or any arbitrary symbols. One of the indices is located opposite each space between each two of the ledger lines.

There is also shown in the drawings, a statement sheet which, in the present instance, includes a leaf 9, a leaf 10, and a fly 11 which is integral with one lateral edge of the leaf 10, the sheet being scored or perforated and folded along the line of union of the fly with the said leaf 10, as indicated by the numeral 12. In a like manner, the sheet is scored or perforated and is folded along the line of union between the leaves 9 and 10 as indicated by the numeral 13. The leaf 9 of the ledger sheet is preferably printed with any desired statement heading 14 and is printed upon one side with columns 15, 16, 17, 18 and 19, which have the same headings as have the columns 2, 3, 4, 5 and 6 of the ledger card respectively, and ledger lines 20 are also printed upon the leaf 9 and divide the columns transversely. Indices 21 are printed in a column opposite the date column 15 of the statement leaf 9, one opposite each of the spaces between each two of the ledger lines. At this point it may be stated that whereas the statement sheet herein shown includes a blank leaf 10, this leaf is only for the purpose of making a duplicate of the statement and may be omitted if desired, the fly 11 being then formed integral with the right hand edge of the leaf 9, as shown in Fig. 5.

As shown in the drawings, debits have been entered upon the ledger card at different periods in the month of February, the last entry being opposite the index 8 in the column of indices indicated by the numeral 8 upon the said ledger card. The statement leaf 9 has, in its debit column, opposite the index 1 of the column of indices thereon an entry of the balance or total of the debits on the ledger card. The first debit for the month of March is illustrated as entered in the debit column opposite the index 2 and other entries have been made at different periods during the month of March. At the time of making the debit entry upon the statement sheet, a carbon sheet 22 is placed upon the ledger sheet and is of a width to cover all of the columns thereon, but to leave the column of indices exposed.

It is first observed that the last entry upon the ledger card for the month of February is opposite the index 8, and inasmuch as the balance or total, as entered upon the statement sheet, is opposite the index 1 of the column of indices thereon, the index 2 of the statement sheet must be brought opposite the index 9 of the ledger card, this being accomplished by placing the statement sheet upon the ledger card with the fly 11 underlying the right hand side of the ledger card, and then sliding the statement sheet up or down upon the ledger card until the indices 2 and 9 of the statement and ledger sheets, respectively, register. The entries for the month of March may then be made upon the statement sheet and will at the same time be made upon the ledger card.

It will be readily understood that the principle of the invention may be applied in numerous classes of accounting work and that the indices may be in the form of numerals or letters of the alphabet, or any arbitrary symbols or lines without departing from the spirit of the invention.

It will be seen at once from the foregoing description that it is necessary to make an entry but once in order for it to appear upon both the statement sheet and the ledger sheet, the several entries appearing upon the ledger sheet in consecutive or sequential relation without interruption, so that the ledger sheet presents a complete history of the purchases of any particular customer, said entries being made upon statement sheets which run for a stated period, preferably a month. When the statement sheet has been filled out it is removed and forwarded to the customer, while the ledger sheet is, of course, retained by the dealer for his own permanent record.

Having thus described the invention what is claimed as new is:—

Means employed in an accounting system comprising a ledger sheet having parallel columns disposed vertically of the sheet and lines disposed longitudinally of the sheet, each of said lines being numbered, the numbers being arranged one above the other; a statement sheet having vertically disposed columns on its surface duplicating the columns on the ledger sheet, and longitudinal lines corresponding to the longitudinal lines of the ledger sheet, each of said lines being numbered, the numbers being arranged one above the other, said statement sheet being provided with a fold disposed to embrace the edge of the ledger sheet whereby the statement sheet may be moved vertically with respect to the ledger sheet, and the columns on the superposed sheets brought into registration with each other and the correspondingly numbered longitudinal lines of the ledger sheet and statement sheet brought into alinement whereby a transfer sheet may be placed between the statement sheet and the ledger sheet and the data which is written upon the statement sheet be transferred to the same relative position on the ledger sheet.

In testimony whereof, I affix my signature in presence of two witnesses.

AARON F. NORTON. [L. S.]

Witnesses:
JESSIE M. TIMERHOFF,
HUNEWELL J. GARNETTE.